(No Model.) 2 Sheets—Sheet 1.

J. A. ENOS.
STORAGE BATTERY.

No. 386,580. Patented July 24, 1888.

Witnesses.
Fred G. Dieterich.
Edw. W. Byrn.

Inventor,
John A. Enos
By Munn & Co
Attorneys.

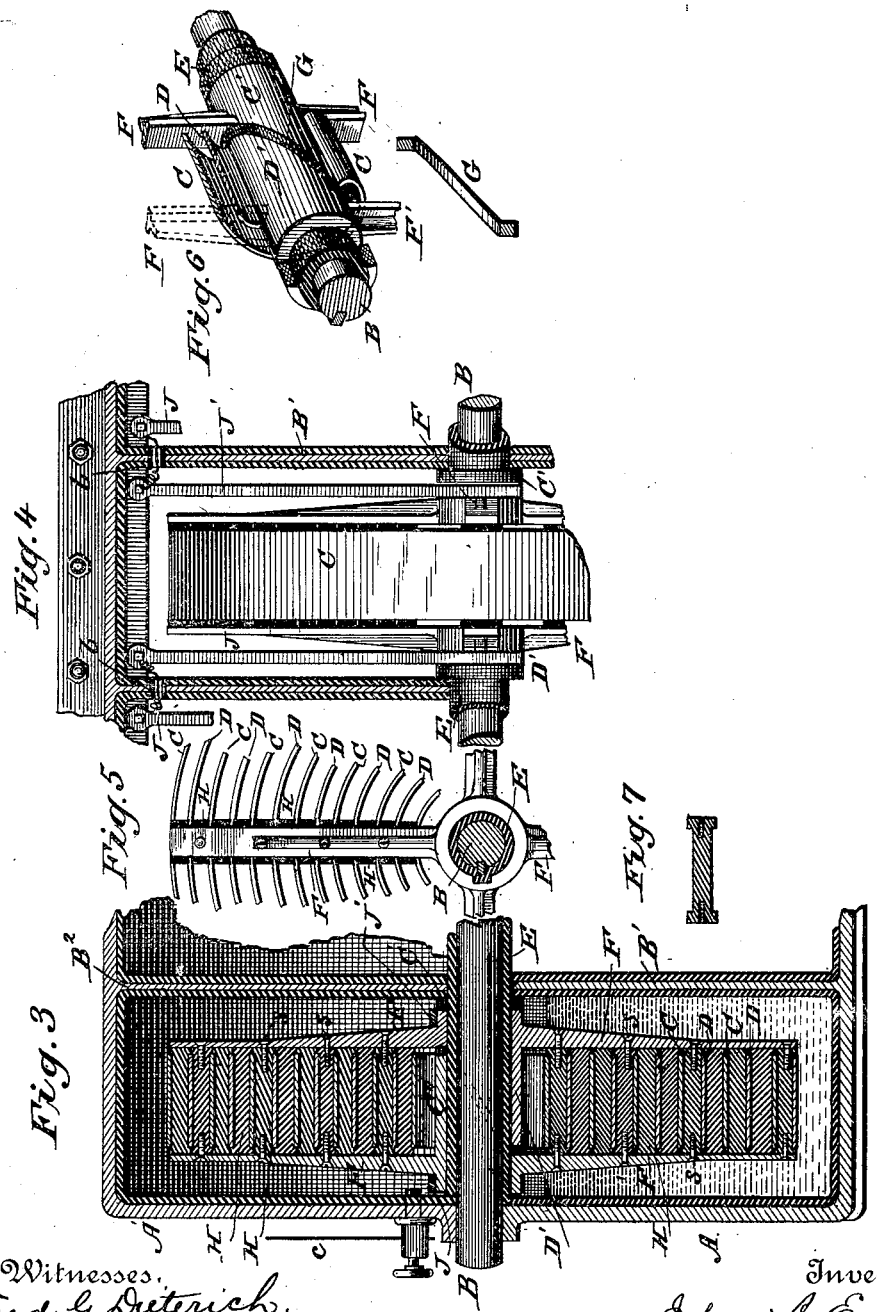

United States Patent Office.

JOHN A. ENOS, OF BOSTON, ASSIGNOR TO WILLIAM C. OTIS, OF NAHANT, E. HERBERT INGALLS AND PAUL WEST, OF BROOKLINE, AND WILLIAM E. PLUMMER, OF NEWTON, MASSACHUSETTS.

STORAGE-BATTERY.

SPECIFICATION forming part of Letters Patent No. 386,580, dated July 24, 1888.

Application filed February 13, 1888. Serial No. 263,832. (No model.)

*To all whom it may concern:*

Be it known that I, JOHN A. ENOS, of Boston, in the county of Suffolk and State of Massachusetts, have invented a new and useful Improvement in Storage-Batteries, of which the following is a specification.

My invention relates to storage-batteries; and it consists in the peculiar construction and arrangement of the elements, which are mounted upon a rotary shaft, so as to revolve, as will be hereinafter fully described.

Figure 1:
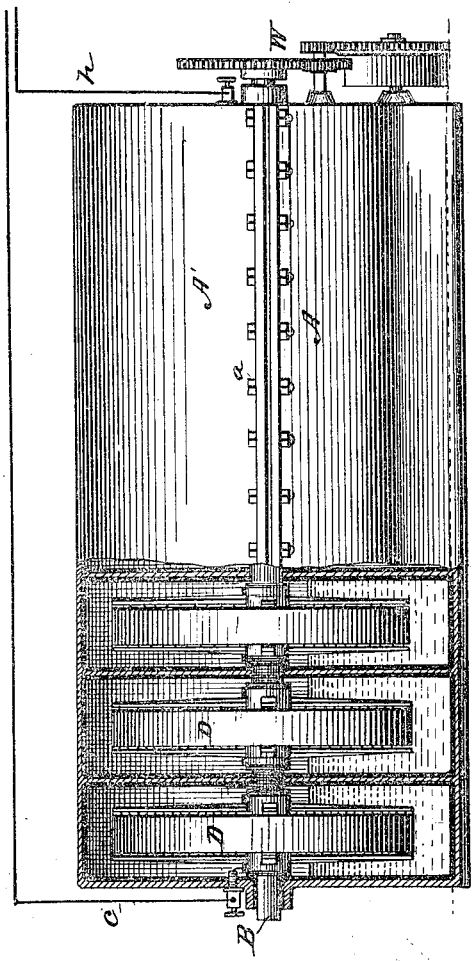
Figure 2:
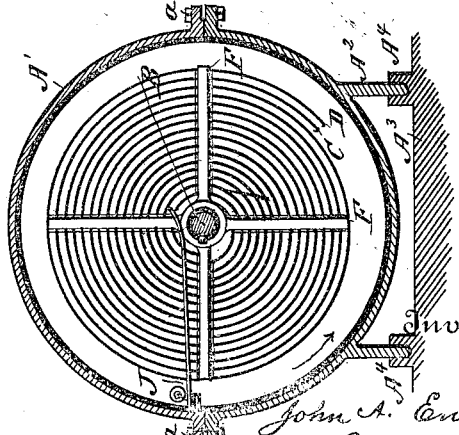

Figure 1 is a side view of the battery, partly in section. Fig. 2 is a vertical cross-section of the battery. Fig. 3 is a vertical longitudinal section of an end cell. Fig. 4 is a horizontal longitudinal section of a middle cell. Fig. 5 is a partial side view of the revolving battery elements. Fig. 6 is a perspective view showing the connections of the positive and negative spiral strips at the hub of the revolving shaft. Fig. 7 is a detail of one of the insulating-blocks.

In the drawings, A A' represent the two portions of the outer casing of the battery, which are made in semi-cylindrical shape with flanges, which are bolted together at $a$. The lower portion, A, of the case is cast with longitudinal supporting ribs or flanges A², which slide upon grooved guide rails or ways A⁴, which are to be attached to the car or other structure to which the battery is to be applied. This construction facilitates the sliding in and out of the batteries and holds them firmly against dislodgment when so slid in.

Both the upper and lower sections of the case are provided with separating-partitions B' and B², which form a number of circular cells arranged side by side. The outer casing is made of iron and the inner surface is lined with hard rubber. B is a longitudinal shaft running through all of these cells and carried in bearings in the ends and in the partitions. This shaft is also covered with a tube, E, of hard rubber. Rigidly fixed to this shaft in each one of the cells is a set of battery elements, each of which is composed of two spirally-wound metallic ribbons, C D, of lead, which are wound in parallel position to each other without touching, in disk form from the center shaft to nearly the inner periphery of the cell. These ribbons are maintained apart from each other by hard-rubber spacing-blocks H and radiating arms F. These latter are made fast to and revolve with the shaft, and through them screws $s$ pass into the spacing-blocks. These spacing-blocks (see Fig. 7) have recessed sides or flanged ends, so that when the ribbons are in place the latter rest in the recess between two adjacent blocks, while the flanges of the blocks abut against each other.

One of the ribbons, C, is electro-negative and the other electro-positive, and they have detached insulated connections at the shaft, as shown in Fig. 6, in which ribbon C is attached to a diagonally-cut metal sleeve, C', and ribbon D to a similarly-cut sleeve, D', a hard-rubber washer, G, being located between them. The outer ends of these metal sleeves extend past the radiating arms F and give a bearing for the brushes or current-conductors J J', Fig. 4, which latter are insulated from each other, but are connected in series (J of one cell with J' of the next) through wires $b$, passing through holes in the partitions B'. At the ends of the batteries are the terminal wires $c$ and $h$.

In the lower portion of the case a dilute mixture of water and sulphuric acid is placed, and the battery elements C D are filled or equipped with the usual materials required in a storage-battery.

At the end of the battery and arranged to turn the shaft B is a clock-work, W, which, by giving a slow rotation to the shaft B, constantly brings new portions of the battery elements into the solution, thus equalizing the action and rendering the current more uniform. In order to prevent the spiral ribbons from taking up the solution and carrying it to the center shaft, where it would soon destroy the insulation, it is necessary to rotate the shaft in one direction only, and that is as shown by the arrow in Fig. 2.

The invention may be applied with equal advantage in the construction of primary galvanic batteries.

Having thus described my invention, what I claim as new is—

1. The battery-case herein described, consisting of two semicylindrical sections, one of which is provided with longitudinal guide-flanges or supporting ribs $A^2 A^2$, adapted to run upon ways, substantially as shown and described.

2. The combination, with the battery-case and a horizontal shaft arranged to rotate therein, of two spirally-wound metal ribbons forming the two elements, the said ribbons being insulated from each other and attached to the shaft, and radial arms for supporting the same, substantially as shown and described.

3. The combination, with the shaft B, having insulating-tube E, of the diagonally-cut and insulated sleeves C' D', the metal ribbons C D, attached thereto, and the radial arms F F', substantially as shown and described.

4. The combination of the battery-case, the shaft B, with insulating-tube E, the diagonally-cut sleeves C' D', brushes J J', the ribbons C and D, the arms F F', and the insulating-blocks H, substantially as and for the purpose described.

JOHN A. ENOS.

Witnesses:
 GEO. B. DEMING,
 O. S. WELLS.